May 26, 1953 S. J. ANDREWS Re. 23,660
FASTENING DEVICE
Original Filed Jan. 16, 1948 2 Sheets-Sheet 1
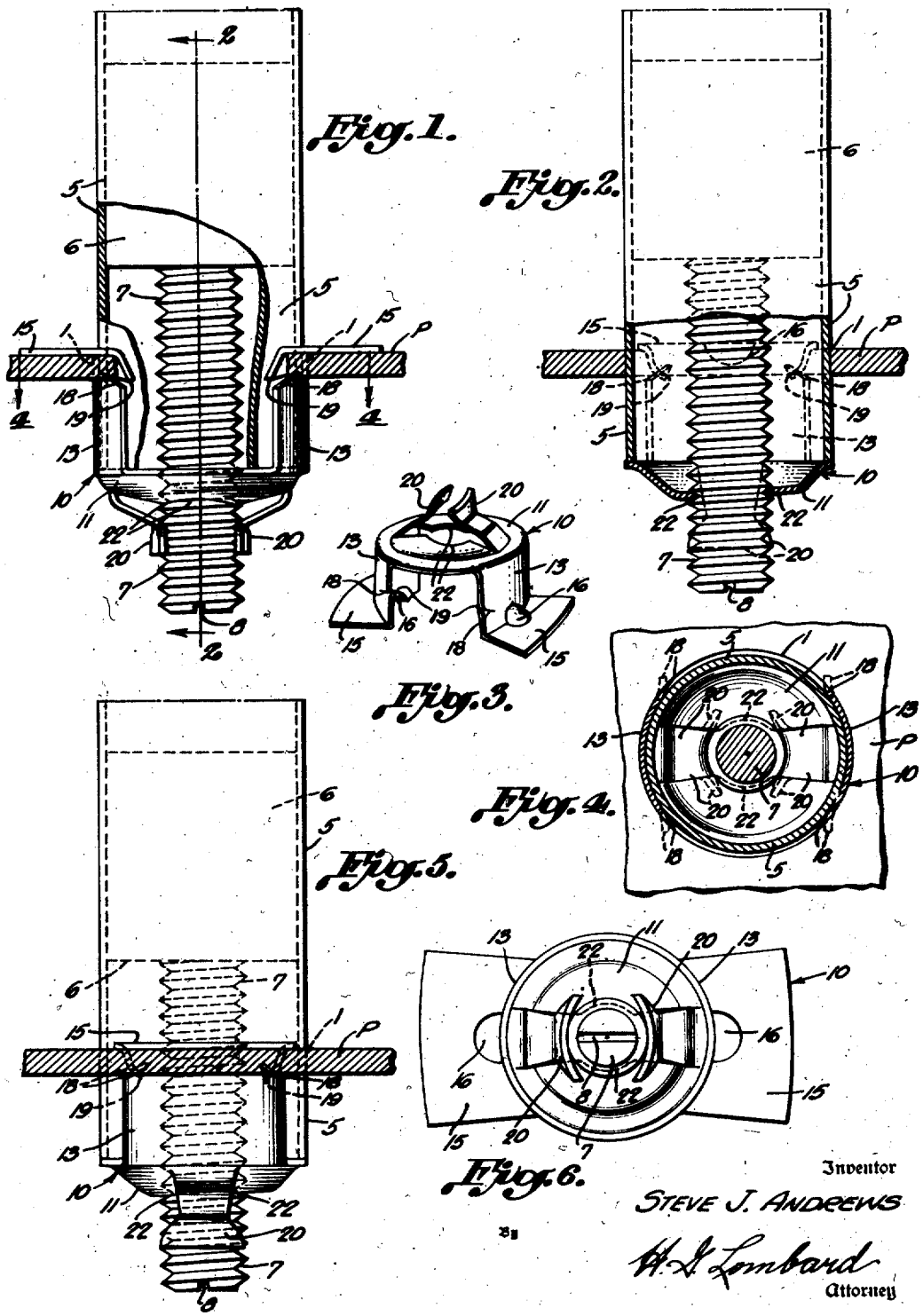
Inventor
STEVE J. ANDREWS
H. L. Lombard
Attorney May 26, 1953 S. J. ANDREWS Re. 23,660
FASTENING DEVICE
Original Filed Jan. 16, 1948 2 Sheets-Sheet 2
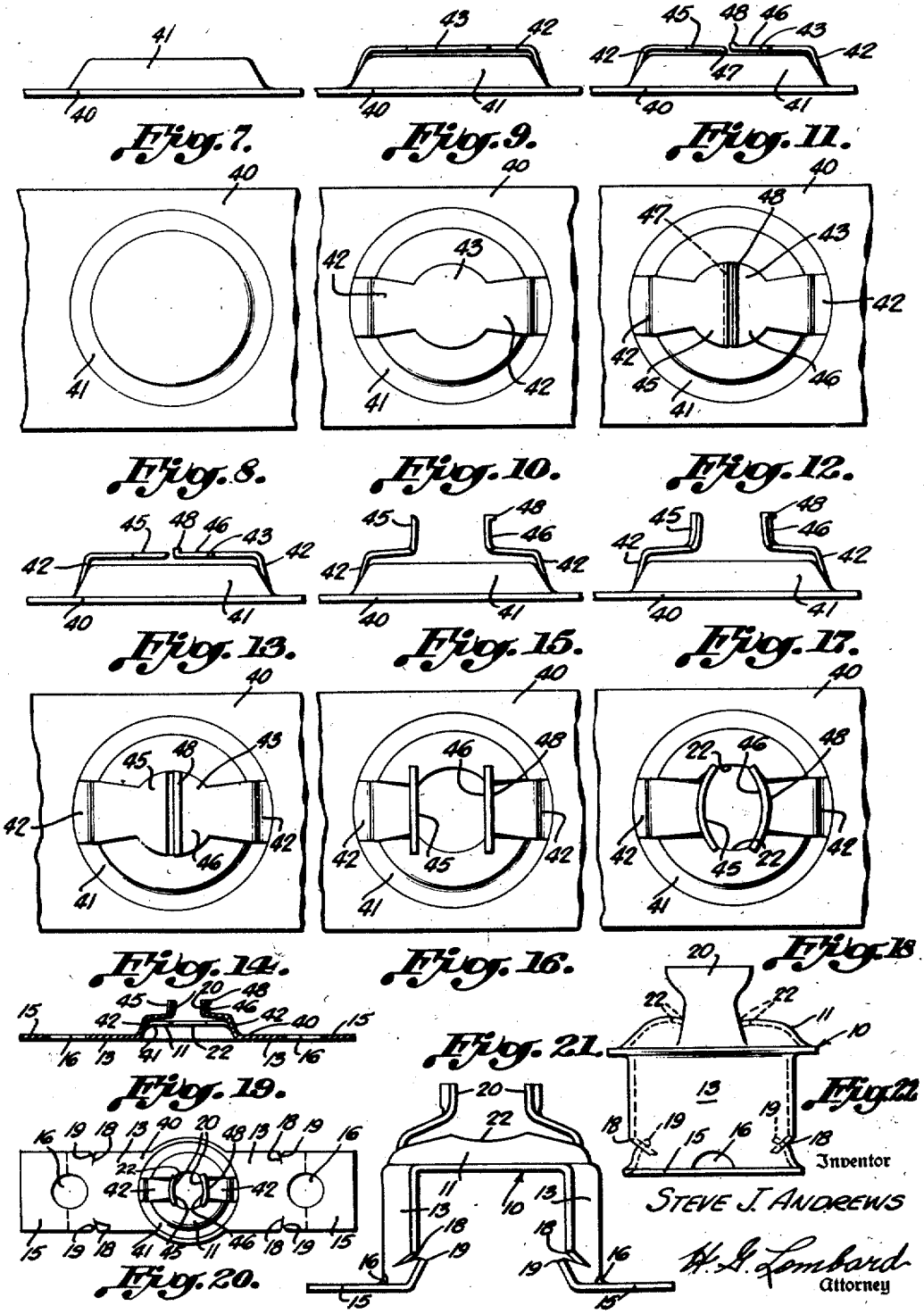
Inventor
STEVE J. ANDREWS
H. G. Lombard
Attorney Reissued May 26, 1953

Re. 23,660

UNITED STATES PATENT OFFICE 23,660

FASTENING DEVICE

Steve J. Andrews, Cleveland, Ohio, assignor to Tinnerman Products, Inc., Cleveland, Ohio, a corporation of Ohio Original No. 2,539,172, dated January 23, 1951, Serial No. 2,679, January 16, 1948. Application for reissue January 30, 1953, Serial No. 334,386

6 Claims. (Cl. 248—27)

Matter enclosed in heavy brackets [ ] appears in the original patent but forms no part of this reissue specification; matter printed in italics indicates the additions made by reissue.

This invention relates in general to improvements in fasteners for instrument mountings and the method of making such fasteners.

More particularly, the invention deals with an improved clip fastener and the method of making the same in a simplified, highly efficient construction for mounting various instruments such as fixed condensers, tuning elements, or like control units of radio apparatus, etc., which embody a tubular casing, post or similar member as in a coil form, for example, that is mounted firmly and rigidly in generally normal relation to a supporting panel in an installation.

In instrument mountings of this character, the improved clip fastener of the invention is designed to mount various instruments such as tubular coil forms, and the like, having an adjusting screw arrangement providing for axial adjustment of the tuning core within the coil form and, in this regard, the adjusting screw is supported in adjustable threaded engagement with a nut portion in the base of the fastener together with friction tongue elements, or the like, having a friction or binding action on the crests of the convolutions of the screw thread to hold the screw in any selected position of adjustment.

In the provision of sheet metal nuts for clamping articles together, it has been found advantageous to so design the thread-engaging elements that they will cut and bite into the root of the screw as the nut is tightened to lock the screw in tightened position. The screw thread at the point of contact in such case is usually more or less marred and mutilated. The action contemplated in the present invention, however, is entirely different inasmuch as the screw is intended to travel frequently back and forth upon the nut for adjusting purposes to meet varying conditions. It is always desirable and sometimes absolutely necessary in tuning applications that adjustments of the parts, or travel of the screw relatively to the nut be smooth, precise and accurate and therefore, the screw thread itself must remain smooth and unmarred. The nut arrangement of the present invention meets this requirement admirably inasmuch as it relies mainly upon frictional engagement for its holding power. In this regard, the diameter of the helix defined by the nut portion of the fastener is preferably slightly larger than the root of the screw, and this nut portion, therefore, rides upon the smooth undersurface of the thread without cutting or biting into the thread. Likewise, the cooperating friction tongues are so designed and formed as to engage only the crests of the screw threads without scratching or marring the threads.

Heretofore, in the manufacture of fasteners having such friction tongues, the stamping and severing of the tongues has resulted in a sharp burr or tang which is highly objectionable and undesirable in that it shaves, scratches and mutilates the crests of the screw threads in use. To avoid such burrs or tangs is difficult due to the fact that the friction tongues are relatively small and the formation thereof difficult to control as they are severed in high speed production.

A primary object of the invention, therefore, is to provide a clip fastener of the kind described and a method of making such a clip fastener in an improved design in which the thread opening and the friction tongues are formed without burrs, tangs or sharp edges of any kind in contact with the screw threads so as to eliminate any possibility of scratching, mutilating or otherwise marring the screw threads.

Another object is to provide such a clip fastener having an improved, highly simplified mounting arrangement comprising snap fastening elements for attaching the same in a panel opening in operative position, and further, with anchoring elements formed complementarily to said snap fastening elements for retaining a coil form or other instrument to be mounted.

A further object of the invention is to provide a fastener having the foregoing structural characteristics and an improved method of making the same from a simple blank obtained from standard sheet metal strip stock with little loss or waste of material.

An additional object of the invention is to provide a spring clip fastener such as described for mounting a tubular member on a plate-like object, which clip is inexpensive to produce, simple to install, adaptable to tubular members and supporting plates within a relatively wide range of tolerances, and when installed, is strong, durable and reliable and not subject to loosening, wobbling or displacement.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a front elevational view, partly in section, of a completed instrument mounting in accordance with the invention, in which the clip fastener is shown in edge elevation and the associated support and instrument body shown partly in section to illustrate the purpose and function of the various elements of the clip;

Fig. 2 is a side elevational view of the completed instrument mounting shown partly in section, as along line 2—2 of Fig. 1, looking in the direction of the arrows;

Fig. 3 is a perspective view of the clip fastener per se;

Fig. 4 is a horizontal sectional view of Fig. 1 as along line 4—4, looking in the direction of the arrows;

Fig. 5 is a side view of Fig. 1 showing the clip in side elevation and the supporting panel in section; and, Fig. 6 is a bottom plan view of the fastener per se showing the core adjusting screw in threaded engagement with the nut portion on the fastener base and in frictional engagement with the friction tongues carried by the fastener base;

Figs. 7 to 20 inclusive illustrate the several steps in the improved method of making the clip fastener of the invention, Figs. 7 and 8 being fragmentary edge elevational and top plan views, respectively, showing the initial step in the method for forming the base of the clip with a protuberance in the central portion of a fastener blank;

Figs. 9 and 10 are similar fragmentary edge elevational and top plan views, respectively, showing the next step by which an intermediate strip in the protuberance is severed and stamped outwardly out of the plane of the protuberance to define the portion from which the friction tongues are to be formed;

Figs. 11 and 12 are similar fragmentary edge elevational and plan views, respectively, illustrating the following step whereby the aforesaid intermediate strip is severed transversely to define the lengths of the friction tongues;

Figs. 13 and 14 are similar fragmentary edge elevational and plan views, respectively, illustrating the next step in the operation for peening the extremity of the friction tongue having an inwardly extending burr so as to remove such burr;

Figs. 15 and 16 are similar fragmentary edge elevational and plan views, respectively, showing the subsequent step for bending the end portions of the friction tongues outwardly in generally normal relation to the base of the clip;

Figs. 17 and 18 are similar fragmentary edge elevational and plan views, respectively, showing the following step for bending the free end portions of the friction tongues transversely in generally arcuate formation to conform generally to the contour of the screw to be employed;

Figs. 19 and 20 are sectional and top plan views, respectively, of the whole fastener blank showing the step in the method for providing the arms or body portions of the fastener with article engaging prongs and complementarily formed cam shoulders adapted for snap fastening engagement in a socket opening in the panel support;

Fig. 21 is an edge elevational view of the completed clip fastener; and

Fig. 22 is a side elevational view of the completed clip fastener.

Although the invention deals, more or less, with the provision of an instrument mounting embodying a simple, reliable and inexpensive fastening means for securing an electrical unit, such as a tuning coil or fixed condenser to a supporting panel of a radio set, for example, it is to be understood, however, that the invention is one of general utility and is not limited to a unit of the class illustrated and described inasmuch as the fastener and expedient modifications thereof may be applied advantageously to other articles in similar or related assemblies within the scope and spirit of the invention.

Referring now, more particularly, to Figs. 1 to 6 inclusive of the drawings, there is shown in Figs. 1, 2, and 5 the general organization for the mounting of an instrument such as a tuning unit, fixed condenser, or the like, which is mounted onto a supporting panel P, such as the base panel of a radio chassis, for example. The tuning unit comprises a generally tubular shaped member 5 such as a tube, sleeve, post, cylinder, or the like, which is constructed of any suitable material such as cardboard, composition material, plastic, etc., to serve as a coil form or equivalent body for any related type of instrument to be mounted on the supporting panel P. The coil tube 5 is intended to be fixedly and rigidly mounted in a socket opening 1 in the supporting panel P and such socket opening, accordingly, is of a size approximating the combined diameter of the tube 5 in assembled relation with the clip as illustrated in Figs. 1 and 4, for example.

In the present example, the tuning unit is shown as including an inner core element 6 which is axially movable within the hollow body of coil tube 5 by an adjusting screw 7 which extends through the panel opening and is movably supported in the assembly by thread engaging means on the fastener base. The adjusting screw 7 is thereby capable of rotation for any desired, fine or minute adjustment of said screw, as by a tool applied to the tool recess 8 provided in the free end of the screw, for example.

The fastener, designated generally 10, is a relatively simple and inexpensive article of manufacture in that it may be most economically constructed from a comparatively small section of any suitable sheet metal, preferably of a spring metal nature, such as spring steel or cold rolled steel having spring-like characteristics. The fastener may be formed from sheet metal blanks of various outlines, but from the standpoint of most economical production is best provided from a generally rectangular blank obtained from standard sheet metal strip stock with little loss or waste of material. As shown in Fig. 3, a blank or stamping of such character is bent into the form of a generally U-shaped fastener comprising a base 11 intermediate a pair of cooperating arms or body portions 13 which are bent into a generally arcuate configuration corresponding to the cylindrical circumference of the coil tube 5 or other cylindrical body in order to engage the same firmly and rigidly on opposite faces thereof.

The free ends of said arms 13 are bent outwardly in opposite directions in the manner of flanges 15. Preferably such flanges are bent downwardly slightly below the horizontal in normal untensioned relation in order to be yieldable in the manner of yieldable head portions so that the fastener is adapted for securing engagement with supports of various thicknesses, within limits, and to compensate for irregularities and manufacturing variations in the thickness of the support adjacent the socket opening 1 therein. As illustrated in Fig. 3, perforations 16 preferably are provided at the junction of flanges 15 with the adjacent arcuate arm portions 13 in order to facilitate bending in the manner shown.

Along the edges of the arms or body portions 13 of the fastener, diagonal slits are provided in a predetermined spacing from the flanges 15 approximating the thickness of the panel on which the fastener is to be mounted. These diagonal slits each define inclined cam shoulders 18 and complementarily shaped prongs 19 both formed at the same time in an inexpensive and highly practical manner. The prongs 19 are bent inwardly in a manner to define inwardly extending barbs adapted to dig into and become embedded in the coil tube 5 when said tube is assembled within the arcuate arms 13 of the tubular clip. The edge portions adjoining the cam shoulders 18 are preferably bent slightly outwardly in the manner of wings to position said inclined cam shoulders 18 in an effective position for snap fastening engagement with the adjacent lower corner edges of the socket opening 1 in the supporting panel P.

In this relation, the adjustable core 6 which is telescopically received within the coil tube 5 is adapted to be supported in the assembly by means of the adjusting screw 7 threadedly engaged with thread engaging means provided in the base 11 of the fastener. Such thread engaging means are designed to supply a tensioned, frictional threaded engagement with said adjusting screw 7 to prevent displacement or loosening thereof from any desired setting or adjusted relation of the tuning core 6 within the coil body 5 in operative position. In a preferred form of such thread engaging means, a substantially diametric strip portion of the base 11 of the fastener is slit and stamped therefrom to provide a pair of opposing yieldable tongue elements 20 which are bent outwardly out of the plane of said base 11 for engaging the crests of the threads of the adjusting screw 7 under tension. Said tongue elements are bent transversely in an arcuate form to define cooperating curved surfaces adapted to engage relatively wide portions of the crests of the screw threads on the screw 7, as shown in Figs. 4 and 6, to effect a substantial frictional drag thereon. In the space from which said friction tongues are provided, there is presented a screw passage with the marginal edges of the side portions 22 bordering such screw passage formed on a helix so as to define thread engaging nut elements adapted for uniform threaded engagement with the threads of the adjusting screw 7 substantially in the manner of a nut.

As shown in Figs. 4 and 6, the edges of such thread engaging nut elements 22 bordering the screw passage, are preferably slightly larger than the root of the adjusting screw 7 and are concentric therewith to engage smoothly in the helical groove defined by the thread of said screw. Also, as illustrated in Figs. 1, 2, and 5, said nut elements 22 are bent or formed in a manner to provide a thread engaging edge lying on a helix corresponding substantially to the helix of the screw thread for even and uniform threaded engagement therewith. Such threaded engagement is usually about thumb tight for best results and, as best seen in Figs. 4 and 6, the corners of said thread elements 22, adjacent the effective thread engaging portions thereof, are preferably rounded off in order to minimize cutting, scratching, shaving or other inordinate wear on the screw threads which might take place under extensive adjusting movements and possibly result in looseness or play in the thread engaging action.

Accordingly, it will be understood that in the assembled relation of the adjusting screw 7 with such thread engaging means, the thread engaging nut elements 22 are received in the helical thread groove of the screw and cooperate with the friction tongues 20 frictionally and grippingly engaging the crests of adjacent convolutions of such thread at all times. There is thus provided an exceptional thread locking action on the adjusting screw 7 as a result of the combined drag exerted on the screw thread by the thread engaging nut portions 22 together with the pronounced, frictional gripping action of the tensioned friction tongues 20 with the crests of the thread convolutions adjacent said thread engaging portions. Said friction tongues 20 otherwise serve to bolster and maintain the adjusting screw 7 in substantially perpendicular relation to the base 11 of the fastener in the threaded relation thereof with the thread engaging elements 22. In this way the cooperative threading action of said thread engaging elements 22 with the adjusting screw is reinforced by said friction tongues 20 and made positive and secure such that any possible looseness or play even after an extended period of use is minimized and practically eliminated. Accordingly, the arrangement is such that the adjusting screw 7 is held by a frictional thread locking action in any adjusted position against accidental turning or unintended rotation which otherwise would disturb the proper setting of the bolt or screw 7. Howeven, even though the adjusting screw 7 is thus retained under the various friction forces set up on the thread thereof, said screw is capable of fine, minute adjustments by means of a tool applied to the recess 8 to turn the same as required in providing any necessary or desired relation of the core 6 within the body of the coil tube 5.

In use, it will be understood that with the various parts of the instrument mounting provided substantially as described, the clip 10 and the adjustable core 6 are assembled by threading the adjusting screw 7 into threaded engagement with the nut elements 22 in the base 11 of the fastener and into frictional contact with the friction tongues 20. The coil tube or coil form 5 is then telescoped over the tuning core 6 and the lower end thereof forced between the arcuately shaped arms or body portions 13 of the clip in a friction, press fit in which the leading edge of the tube seats rigidly on the fastener base 11 and the prongs 19 dig into and become embedded in adjacent surfaces of said tube 5 to anchor the same in such assembled position with the clip fastener. The prongs 19 are formed to extend inwardly and downwardly so as to permit movement of the tube to the aforesaid assembled position in one direction but prevent movement in the opposite direction toward disassociation from the clip.

Although the core 6 may be assembled in a similar manner after the coil tube 5 is mounted onto the supporting panel, the foregoing procedure is preferable in that all the parts of the instrument are assembled and ready for the final step in mounting the unit on the panel in a simple and speedy procedure, which, of course, is most important in mass production methods in that the complete units may be prepared in quantities ready for quick and easy installation in a minimum of time and effort as is necessary on an assembly line, for example.

With the instrument unit thus assembled, the same is easily and quickly mounted on the supporting panel P by inserting the base 11 and the adjacent lower securing portions of the arms 13 of the fastener through the socket opening 1 in a manner whereby the leading edges of the outwardly bent wings carrying the inclined cam shoulders 18 serve as substantial guide surfaces which cam the side walls of such socket opening with progressively increasing force. This causes a gradual compression of said wings inwardly as necessary to permit passage thereof through said socket opening 1 to a position in which the inclined cam shoulders 18 on said wings snap into engagement with the lower corner edges of said socket opening and the adjacent marginal portions at the underface of the panel P, substantially as shown in Figs. 1 and 4. In this position, the flanges 15 bear upon the opposite face of the panel P to cooperate with said cam shoulders 18 in engaging opposite sides of said panel to retain the instrument in firm, rigid, fixedly mounted position thereon.

If desired, a substantially positive locked mounting may be provided by forming the shoulders 18 in a more pronounced configuration to engage material portions of the panel adjacent the socket opening 1 in substantial abutting engagement therewith so that there is little or no possibility of displacement or accidental removal of the mounting. However, the provision of said shoulders 18 in the manner of inclined or tapered substantial cam surfaces, as shown, is more advantageous in certain respects in that the use of a certain size fastener with supporting panels of several thicknesses is possible. Also, a positive, self-seating of the fastener in rigid mounted position is ensured by reason of the expansive action supplied by the inherent resiliency of the wings adjoining the cam shoulders 18 to urge the said cam shoulders outwardly in a manner to cause the same to ride automatically on the lower corner edges of the socket opening to the point of most effective locked fastening engagement therewith substantially as shown in Figs. 1 and 4. It is also to be appreciated that the spring flanges 15 preferably are bent slightly downwardly in normal untensioned relation and are thereby effective to cause said cam shoulders 18 to compensate for slight clearances and other manufacturing variations in the size of the socket opening and the thickness of the panel member. Likewise, any looseness or play in the connection after a period of use is immediately taken up such that an installation embodying the improved instrument mounting of the invention is rigid and positive throughout its entire length of service.

In the event that removal of the mounting is desired, this may be accomplished simply by exerting suitable force on the arms or body portions 13 to urge the same inwardly in a manner whereby the shoulders 18 thereon may clear the socket opening 1 as the unit is pushed in an axial direction opposite to that in which the same was applied to mounted position, whereupon the several parts of the instrument may be disassociated in a reversal of the procedure described for assembling the unit.

Figs. 7 to 20 inclusive disclose the various steps in the method of making the aforesaid clip fastener with the completed article of manufacture being shown in Figs. 21 and 22. Figs. 7 and 8 represent the central portion 40 of the fastener blank defining the base portion 11 between the arms or body portions 13, and this central portion is stamped into an outwardly projecting protuberance 41 in the initial step of manufacture.

As shown in Figs. 9 and 10, the protuberance 40 is then slit to define a diametric strip portion 42 having an intermediate circular area 43 approximating the required size of the screw passage to be formed in the fastener base. In the succeeding step shown in Figs. 11 and 12, the intermediate strip 42 is severed transversely across the center of the circular area 43 to define the elements 45, 46, from which the friction tongues in the completed fastener are formed. In this severing operation, there necessarily results, at the point of shear, slight burrs 47, 48, on the extremities of the elements 45, 46, respectively. The burr 47 which faces the screw thread in the complete formation of the friction tongues is highly objectionable in that it would shave and easily wear away the screw thread and thereby cause the same to grow loose and unserviceable. Moreover the small hair-like shavings of metal which result are very undesirable in that they fall into the delicate electrical parts of the radio and cause defects and faulty operation thereof.

Accordingly, as shown in Figs. 13 and 14, the objectionable burr 47 is removed by a flattening or peening operation which leaves the inner surface of the tongue element 45 smooth and flat. The burr 48 on the other tonque element 46 extends away from the screw thread in the completed formation thereof and accordingly, need not be removed.

Figs. 15 and 16 disclose the following step in which the end portions of the tongue elements 45, 46, are bent outwardly to generally parallel spaced relation and, as illustrated in Figs. 17 and 18, such end portions otherwise bent transversely in arcuate form to define the final design of the friction tongues 20 in the completed fastener as shown in Figs. 1–6, inclusive, and Figs. 21 and 22.

During the foregoing operations, the marginal portions of the circular screw passage in the fastener base are suitably worked to provide such marginal portions in the form of a helix defining the nut portions 22 for threadedly engaging the adjustable core screw 7, as described with reference to Figs. 1–6, inclusive.

With the central portion 40 of the fastener blank thus formed, the whole fastener blank, as illustrated in Figs. 19 and 20, comprises the central portion 40 defining the fastener base 11 and the arms 13 together with the end flange portions 15 on either side thereof. The arms 13 are provided with the perforations 16 and the diagonal slits on the longitudinal edges thereof, Fig. 20, defining the inclined cam shoulders 18 and the adjacent complementarily formed prongs 19. The edge portions adjoining the cam shoulders 18 are bent outwardly slightly in the form of wings, as described, and the prongs 19 bent inwardly for engaging and anchoring the coil tube which is assembled between the arms 13 of the completed fastener, while the arms 13 themselves are cupped transversely in arcuate form to provide the generally tubular formation of the clip body.

The fastener 10 is completed by bending the said arms 13 relatively to the base 11 in the same general direction to define the generally tubular design of the clip and the end flanges 15 also formed by further outward bends along the transverse dotted lines, Fig. 20, to extend outwardly in opposite directions in the completed form of clip fastener shown in Figs. 3, 21, and 22. Preferably the perforations 16 are provided in the arms 13 to facilitate bending of the substantially flat end flanges 15 relatively to the transversely curved surfaces of said arms 13.

In any form, the fastener is preferably constructed of relatively thin sheet metal, the thickness of which is selected according to service requirements and the predetermined size of the parts of the mounting. The fasteners are most effective when provided of spring metal suitably spring tempered and heat treated to give the desired toughness or hardness. A cheap but effective fastener may also be provided from cold rolled metal which is untempered but of a spring metal nature and preferably harder than the metal of the adjusting screw in order that the integral thread engaging portion provided therein will not be subject to any degree of wear which would affect the precise and exact fit of the respective parts of the instrument mounting.

While the invention has been described in detail with specific examples, such examples are intended as illustrations only, since it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A clip fastener for attaching an instrument in an opening in a plate comprising a sheet metal body defining a base and spaced attaching arms extending from said base in generally tubular formation, the edges of said arms having inclined slits providing inwardly bent prongs and complementarily shaped shoulders for engaging said plate adjacent said opening, a pair of tongues severed from said fastener base and providing in said base circular thread elements bent to lie on a helix for uniform threaded engagement with a threaded member, said tongues having their end portions bent to provide smooth inner surface portions in spaced face to face relation and curved transversely in arcuate form for engaging substantial curved areas of the crests of the thread convolutions of the threaded member.

*2. A clip fastener for attaching an instrument in an opening in a plate comprising a sheet metal body defining a base and spaced attaching arms extending from said base in generally tubular formation, the edges of said arms having inclined slits providing inwardly bent prongs and complementarily shaped shoulders for engaging said plate adjacent said opening, said shoulders on said arms being provided on wing portions bent outwardly from said arms and the edges of said wing portions below said shoulders defining guide surfaces leading to said shoulders, a pair of tongues severed from said fastener base and providing in said base circular thread elements bent to lie on a helix for uniform threaded engagement with a threaded member, said tongues having their end portions bent to provide smooth inner surface portions in spaced face to face relation and curved transversely in arcuate form for engaging substantial curved areas of the crests of the thread convolutions of the threaded member.*

*3. A clip fastener for attaching an instrument in an opening in a plate comprising a sheet metal body defining a base and spaced attaching arms extending from said base in generally tubular formation, the edges of said arms having inclined slits providing inwardly bent prongs and complementarily shaped shoulders for engaging said plate adjacent said opening, a pair of tongues severed from said fastener base and providing in said base circular thread elements at opposite sides of said tongues, said thread elements being bent to lie on a helix for uniform threaded engagement with a threaded member, said tongues having their end portions bent to provide smooth inner surface portions in spaced face to face relation and curved transversely in arcuate form for engaging substantial curved areas of the crests of the thread convolutions of the threaded member.*

*4. A clip fastener for attaching an instrument in an opening in a plate comprising a sheet metal body defining a base and spaced attaching arms extending from said base in generally tubular formation, the edges of said arms having inclined slits providing inwardly bent prongs and complementarily shaped shoulders for engaging said plate adjacent said opening, said shoulders on said arms being provided on wing portions bent outwardly from said arms and the edges of said wing portions below said shoulders defining guide surfaces leading to said shoulders, a pair of tongues severed from said fastener base and providing in said base circular thread elements at opposite sides of said tongues, said thread elements being bent to lie on a helix for uniform threaded engagement with a threaded member, said tongues having their end portions bent to provide smooth inner surface portions in spaced face to face relation and curved transversely in arcuate form for engaging substantial curved areas of the crests of the thread convolutions of the threaded member.*

*5. A clip fastener for attaching an instrument in an opening in a plate comprising a sheet metal body defining a base and spaced attaching arms extending from said base in generally tubular formation and terminating in outwardly extending flanges, the edges of said arms having inclined slits providing inwardly bent prongs and complementarily shaped shoulders spaced from said flanges for engaging said plate adjacent said opening, said shoulders on said arms being provided on wing portions bent outwardly from said arms and defining guide surfaces leading to said shoulders, a pair of tongues severed from said fastener base and providing in said base circular thread elements bent to lie on a helix for uniform threaded engagement with a threaded member, said tongues having their end portions bent to provide smooth inner surface portions in spaced face to face relation and curved transversely in arcuate form for engaging substantial curved areas of the crests of the thread convolutions of the threaded member.*

*6. A clip fastener for attaching an instrument in an opening in a plate comprising a sheet metal body defining a base and spaced attaching arms extending from said base in generally tubular formation and terminating in outwardly extending flanges for engaging one side of said plate, the edges of said arms having inclined slits providing inwardly bent prongs and complementarily shaped shoulders spaced from said flanges for engaging the opposite side of said plate adjacent said opening, said shoulders on said arms being provided on wing portions bent outwardly from said arms and defining guide surfaces leading to*

*said shoulders, a pair of tongues severed from said fastener base and providing in said base circular thread elements at opposite sides of said tongues, said thread elements being bent to lie on a helix for uniform threaded engagement with a threaded member in cooperation with said tongues, said tongues having their end portions bent to provide smooth inner surface portions in spaced face to face relation and curved transversely in arcuate form for engaging substantial curved areas of the crests of the thread convolutions of the threaded member.*

STEVE J. ANDREWS.

References Cited in the file of this patent or the original patent

UNITED STATES PATENTS

| Number | Name | Date |
|---|---|---|
| 2,076,043 | Ryder | Apr. 6, 1917 |
| 2,113,535 | Cuno et al. | Apr. 5, 1938 |
| 2,207,507 | Douglas | July 9, 1940 |
| 2,244,976 | Tinnerman | June 10, 1941 |
| 2,244,978 | Tinnerman | June 10, 1941 |
| 2,376,167 | Mitchell | May 15, 1945 |
| 2,377,694 | Judd | June 5, 1945 |
| 2,398,374 | Hartman | Apr. 16, 1946 |
| 2,434,844 | Flora | Jan. 20, 1948 |